United States Patent Office 3,479,391
Patented Nov. 18, 1969

3,479,391
Δ$^{3,14}$-17α-HYDROXY-NORPROGESTERONE
AND ESTERS
Pacifico Principe, South River, and Seymour D. Levine, North Brunswick, N.J., assignors to E. R. Squibb & Sons, Inc., New York, N.Y., a corporation of Delaware
No Drawing. Filed Oct. 3, 1966, Ser. No. 583,956
Int. Cl. C07c 69/12, 49/46, 69/00
U.S. Cl. 260—488                                4 Claims

ABSTRACT OF THE DISCLOSURE

Δ$^{3,14}$-17α-hydroxy-A-norprogesterone and esters which are anti-androgenic agents.

---

This invention relates to and has for its objects the provision of new physiologically active compounds of the following Formulae I and II:

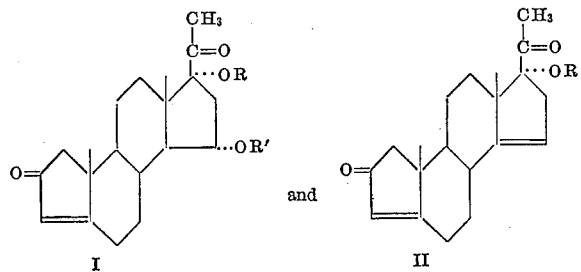

wherein R and R' are each hydrogen or acyl.

The preferred acyl radicals are those derived from hydrocarbon carboxylic acids of less than twelve carbon atoms and include such acids as the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids. The preferred acyl radicals defined by R' also include those derived from hydrocarbon sulfonic acids of less than twelve carbon atoms and include such acids as the lower alkane sulfonic acids (e.g., methane sulfonic acid and ethane sulfonic acid), the lower alkene sulfonic acids, the monocyclic aryl sulfonic acids (e.g., benzene sulfonic acid and p-toluene sulfonic acid), the monocyclic aryl lower alkane sulfonic acids (e.g., phenyl methane sulfonic acid), the cycloalkene sulfonic acids and the cycloalkene sulfonic acids.

The novel compounds of this invention are physiologically active and possess anti-androgenic activity, i.e., they inhibit the action of androgens and they may be employed in the treatment of such conditions as hyperandrogenic acne. The compounds may be formulated for such administration, the concentration and/or dosage being based on the activity of the particular compound.

To prepare the compounds of this invention, 17α-hydroxy-A-norprogesterone is subjected to the actions of *Colletotrichum linicola*, or to the actions of the enzymes thereof, under oxidizing conditions. This oxidation can best be effected either by including 17α-hydroxy-A-norprogesterone in an aerobic culture of the microorganism, or by bringing together in an aqueous medium, the compounds, air and enzymes of non-proliferating cells of the microorganism.

In general, the conditions of culturing the microorganism for the purposes of this invention are (except for the inclusion of 17α-hydroxy-A-norprogesterone) the same as those of culturing various other microorganisms for the production of antibiotics, vitamin B-12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purpose of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

This microbial process yields 15α,17α-dihydroxy-A-norprogesterone, which is a new compound of this invention.

The 15α,17α-dihydroxy compound may then be acylated as by treatment with an acyl halide or acid anhydride of a hydrocarbon carboxylic acid of less than twelve carbon atoms or a hydrocarbon sulfonic acid of less than twelve carbon atoms. If the acylation is carried out in the presence of a base (e.g., pyridine), a 15α-monoester is obtained. If the acylation is carried out in the presence of a strong acid (e.g., perchloric acid), a 15α,17α-diester is obtained. Moreover, if a 15α-monoester is used as the reactant and a strong acid is used as the catalyst, a mixed 15α,17α-diester can be formed by using different acylating agents in the two steps.

If a basic catalyst is used and the acylating agent employed is a sulfonic acid, a 15α-monosulfonyloxy ester is obtained. By heating this ester with a base, such as collidine, 17α-hydroxy-14-dehydro-A-norprogesterone, a compound of this invention, can be formed, and can be esterified by treatment with an acylating agent in the presence of a strong acid to yield the 17α-ester derivatives of this invention.

The following examples illustrate the invention (all temperatures being in centigrade):

Example 1.—15α,17α-dihydroxy-A-norprogesterone (A) Fermentation.—Surface growth from each of 2 two-week-old agar slants of *Colletotrichum linicola* (NCTC-1194), the slants containing as a nutrient medium (A):

| | Grams |
|---|---|
| Glucose | 10 |
| Yeast extract | 2.5 |
| $K_2HPO_4$ | 1 |
| Agar | 20 |

Distilled water to one liter.

is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Dextrose | 10 |
| Cornsteep liquor | 6 |
| $NH_4H_2PO_4$ | 3 |
| Yeast extract | 2.5 |
| $CaCO_3$ | 2.5 |

Distilled water to one liter.

After 72 hours incubation at 25° with continuous rotary agitation (280 cycles/minute; two inch stroke), 10% vol./vol.) transfers are made to thirty-four 250 ml. Erlenmeyer flasks each containing 50 ml. of freshly sterilized medium B. After 24 hours of further incubation, using the same conditions as described above, the steroid (300 micrograms/ml.) is added by supplementing each flask with 0.25 ml. of a sterile solution (60 mg./ml.) of 17α-hydroxy-A-norprogesterone in N,N-dimethylformamide. A total of 510 mg. is fermented.

After approximately four hours of further incubation, using identical conditions as described above, the contents of the flanks are pooled and the broth is then filtered through a Seitz clarifying pad. The flasks, mycelium and pad are washed with successive 50 ml. portions of warm water. The combined filtrate and washings have a volume of 2000 ml.

(B) Isolation.—The filtrate obtained in step A is extracted three times with chloroform. The chloroform extracts are washed three times with water, dried over sodium sulfate and evaporated to dryness. The residue is crystallized from acetone-isopropyl ether to give about 282 mg. of 15α,17α-dihydroxy-A-norprogesterone, M.P. 200–202.5°. The analytical sample is prepared by recrystallization from methanol-isopropyl ether, M.P. 206–208°; $[\alpha]_D^{24}$ +26° (EtOH); $\lambda^{KBr}$ 2.89, 5.90 (sh.), 5.98 and 6.20μ; $\lambda^{EtOH}$ 234mμ (15,800);

$\tau^{TMS}_{CDCl_3}$ 9.20 (s. 18–Me), 8.82 (s. 19–Me), 7.70 (s. 21–Me), 6.02 (m. 15β–H) and 4.27 (s. 3–H).

*Analysis.*—Calcd. for $C_{20}H_{28}O_4$ (332.42): C, 72.26; H, 8.49. Found: C, 72.42; H, 8.52.

Example 2.—15α-acetoxy-17α-hydroxy-A-norprogesterone

A solution of 35 mg. of 15α,17α-dihydroxy-A-norprogesterone in 0.25 ml. of acetic anhydride and 0.50 ml. of pyridine is left overnight at room temperature. The reaction mixture is diluted with water and extracted with chloroform. The chloroform extracts are washed with a saturated sodium bicarbonate solution, 8% salt solution, dried over sodium sulfate and evaporated to dryness. The residue is crystallized from acetone-ether to give about 20 mg. of 15α-acetoxy-17α-hydroxy-A-norprogesterone, M.P. 200–202°. The analytical sample is prepared by recrystallization from acetone-isopropyl ether, M.P. 200–202°; $[\alpha]_D^{24}$ +12° (EtOH); $\lambda^{KBr}$ 2.92, 5.77, 5.87, 5.96 and 6.17μ; $\lambda^{EtOH}$ 233 mμ (16,200);

$\tau^{TMS}_{CDCl_3}$ 9.18 (s. 18–Me), 8.82 (s. 19–Me), 7.99 (s. 15α-acetate), 7.74 (s. 21–Me), 5.03 (m.w. ½ 20 c.p.s., 15β–H) and 4.28 (s. 3–H).

*Analysis.*—Calcd. for $C_{22}H_{30}O_5$ (374.46): C, 70.56; H, 8.08. Found: C, 70.12; H, 8.23.

Example 3.—15α,17α-diacetoxy-A-norprogesterone

A solution of 0.0033 ml. of perchloric acid in 0.3 ml. of acetic anhydride is added to 500 mg. of 15α,17α-dihydroxy-A-norprogesterone or 15α-acetoxy-17α-hydroxy-A-norprogesterone in 10 ml. of acetic anhydride. The reaction mixture is stirred at room temperature for 30 min. and then poured into ice-water and extracted with chloroform. The chloroform extracts are washed with a saturated sodium bicarbonate solution, 8% salt solution, dried over sodium sulfate and evaporated to dryness to give 15α,17α diacetoxy-A-norprogesterone.

Similarly, if another acylating agent, such as propionic anhydride and benzoyl chloride, is substituted for the acetic anhydride in the procedures of Examples 2 and 3, the corresponding esters are obtained.

Example 4.—15α-mesyloxy-17α-hydroxy-A-norprogesterone

A solution of 100 mg. of 15α,17α-dihydroxy-A-norprogesterone in 2.5 ml. of pyridine at 6° is treated with 0.15 ml. of mesyl chloride and left at that temperature overnight. The reaction mixture is diluted with water and extracted with chloroform. The chloroform extracts are washed with 2 N HCl, 8% salt solution, dried over sodium sulfate and evaporated to dryness. The residue is crystallized from acetone-hexane to give about 72 mg. of 15α-mesyloxy-17α-hydroxy-A-norprogesterone, M.P. 156–157° (d). The analytical sample is prepared by recrystallization from acetone-hexane, M.P. 157–158° (d); $\lambda^{KBr}$ 2.92, 5.88, 6.01, 6.20 and 8.56μ; $\lambda^{EtOH}$ 233 mμ (16,900);

$\tau^{TMS}_{CDCl_3}$ 9.21 (s. 18–Me), 8.82 (s. 19–Me), 7.73 (s. 21–Me), 6.98 (s. 15α-mesylate), 5.03 (m.w. ½ 20 c.p.s. 15β–H) and 4.25 (s. 3–H).

*Analysis.*—Calcd. for $C_{21}H_{30}O_6S$ (410.54): S, 7.81. Found: S, 8.21.

Example 5.—17α-hydroxy-14-dehydro-A-norprogesterone

A solution of 100 mg. of 15α-mesyloxy-17α-hydroxy-A-norprogesterone in 5 ml. of collidine is refluxed for 0.5 hr. The reaction mixture is diluted with chloroform and washed with 2 N HCl, 8% salt solution, dried over sodium sulfate and evaporated to dryness to give 17α-hydroxy-14-dehydro-A-norprogesterone.

Example 6.—17α-acetoxy-14-dehydro-A-norprogesterone

17α-acetoxy-14-dehydro-A-norprogesterone is prepared by acetylation of 17α-hydroxy-14-dehydro-A-norprogesterone with acetic anhydride perchloride acid as described in Example 3.

Similarly, other acylating agents, if substituted for the acetic anhydride in Example 6, yield their corresponding 17-esters.

The invention may be variously otherwise embodied within the scope of the appended claims.

What is claimed is:
1. A compound of the formula

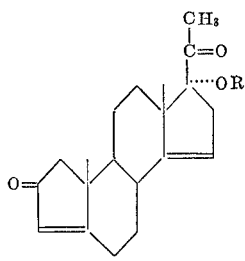

wherein R is hydrogen or the acyl radical of a hydrocarbon carboxylic acid of less than twelve carbon atoms.
2. The compound of claim 1, wherein R is hydrogen.
3. The compound of claim 1, wherein R is the acyl radical of a hydrocarbon carboxylic acid of less than twelve carbon atoms.
4. The compound of claim 1, wherein R is acetyl.

References Cited
UNITED STATES PATENTS 3,274,237  9/1966  Becker et al. _____ 260—488
3,179,698  8/1965  Weisenborn et al. ____ 260—586

JAMES A. PATTEN, Primary Examiner

V. GARNER, Assistant Examiner

U.S. Cl. X.R.

195—51; 260—410, 456, 468, 476, 486, 586, 999